(12) United States Patent
Schuette et al.

(10) Patent No.: US 9,332,413 B2
(45) Date of Patent: May 3, 2016

(54) METHOD AND APPARATUS FOR PROVIDING SERVICES TO A GEOGRAPHIC AREA

(71) Applicant: MOTOROLA SOLUTIONS, INC, Schaumburg, IL (US)

(72) Inventors: Michael A Schuette, Wilmette, IL (US); Philip E May, Palatine, IL (US); Michael D Pearce, Barrington, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 206 days.

(21) Appl. No.: 14/060,721

(22) Filed: Oct. 23, 2013

(65) Prior Publication Data

US 2015/0111516 A1   Apr. 23, 2015

(51) Int. Cl.
*H04W 4/22* (2009.01)

(52) U.S. Cl.
CPC ...................................... *H04W 4/22* (2013.01)

(58) Field of Classification Search
CPC .............................. H04W 76/007; H04W 4/22
USPC ................................ 455/404.1; 709/227, 209
See application file for complete search history.

(56) References Cited

U.S. PATENT DOCUMENTS

| 6,094,680 | A | 7/2000 | Hokanson |
| 2005/0273668 | A1 | 12/2005 | Manning |
| 2007/0088777 | A1* | 4/2007 | Maeda et al. ................. 709/202 |
| 2009/0089365 | A1 | 4/2009 | Serghi et al. |
| 2010/0131584 | A1 | 5/2010 | Johnson |
| 2011/0072122 | A1 | 3/2011 | Miller et al. |
| 2011/0082940 | A1* | 4/2011 | Montemurro et al. ........ 709/227 |
| 2014/0099987 | A1 | 4/2014 | Saito |

FOREIGN PATENT DOCUMENTS

| AU | 2006242975 A1 | 11/2007 |
| AU | 2003230258 B2 | 2/2008 |
| AU | 2007309945 A1 | 5/2009 |
| AU | 2007339381 A1 | 7/2009 |
| CA | 2308282 A1 | 12/2000 |
| KR | 1020130091890 A | 8/2013 |
| WO | 9831107 A2 | 7/1998 |
| WO | 2010028278 A2 | 3/2010 |

OTHER PUBLICATIONS

GB Search and Examination Report Dated Feb. 27, 2015 for Counterpart Application GB1417207.6.
Roberto Aldunate,Sergio F. Ochoa, Feniosky Pena-Mora and Miguel Nussbaum, "Robust Mobile Ad Hoc Space for Collaboration to Support Disaster Relief Efforts Involving Critical Physical Infrastructure"; J. Comput. Civ. Eng., 20(1); Feb. 27, 2012.
Sylvain Ductor, Zahia Guessoum and Mikal Ziane, "Resource Management and Adaptive Replication for Fault-Tolerant MAS", pp. 1-15, Website address: http://www-poleia.lip6.fr/~ductors/ressources/publis/RMS_DuctorGuessoumZiane_MMAS09; 2009.

* cited by examiner

*Primary Examiner* — Lester Kincaid
*Assistant Examiner* — Gary Lafontant
(74) *Attorney, Agent, or Firm* — Daniel R. Bestor

(57) ABSTRACT

A method and apparatus for providing a service at an incident scene is provided herein. During operation, a device will enter a geographic area (e.g., an incident scene), join a local-area network (LAN), and determine what services are presently being offered by other devices on the LAN. From a list of services deployed on the device, a determination is then made as to what services the device will run, and those services are then offered to all devices on the LAN.

14 Claims, 4 Drawing Sheets

METHOD AND APPARATUS FOR PROVIDING SERVICES TO A GEOGRAPHIC AREA

FIELD OF THE INVENTION

The present invention generally relates to providing services to a geographic area, and more particularly to a method and apparatus for dynamically providing a service to a plurality of devices located at a public-safety incident scene.

BACKGROUND OF THE INVENTION

Many users, especially in markets such as public safety, will use multiple devices, running multiple applications and services, throughout their day. These devices include things such as laptop devices, handheld computers, tablets, cellular telephones, public-safety radios, . . . , etc. Even when a device is not currently being used by an individual, application(s) may continue to run on device 400, utilizing valuable wide-area network (WAN) bandwidth.

The amount of bandwidth being used by WAN infrastructure could increase dramatically in scenarios where a large number of co-located users exist. For example, consider a situation where a large amount of police officers arrive on a scene, with each police officer carrying multiple devices. Any public-safety WAN servicing the scene may be quickly overwhelmed by the amount of data being transmitted.

What makes the above situation even worse is the fact that as public safety officers leave their vehicles, any devices left within their vehicles may be using valuable bandwidth, even though the devices are not being used by any public safety officer. Those devices that are brought into the field with the officers may suffer degraded service as a result of the bandwidth consumed by the applications running on unused devices.

As is evident, having devices utilize less WAN bandwidth is desirable. If network devices can be equipped with the necessary functionality to provide needed services via a local-area network (LAN), then precious WAN bandwidth may be conserved. Therefore, a need exists for a method and apparatus for dynamically providing services to a geographic area via a LAN that greatly reduces an amount of WAN bandwidth needed to service a given incident scene.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Figure 1:
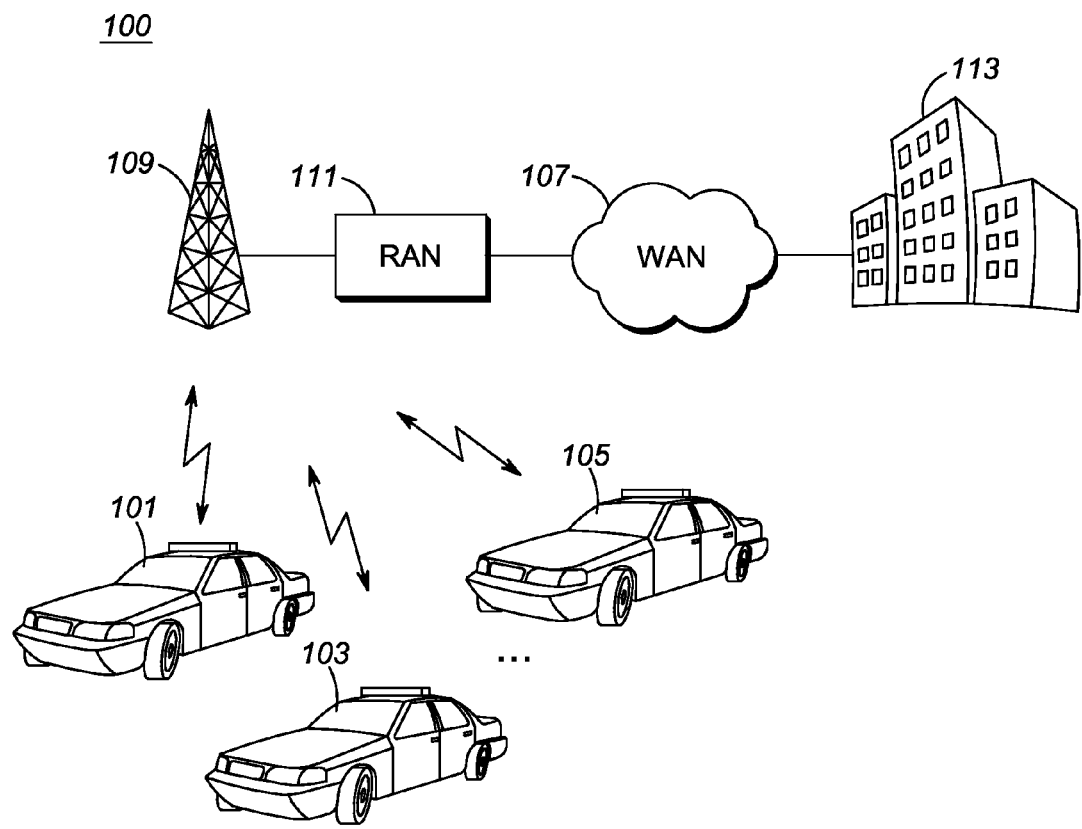
FIG. 1 illustrates a prior-art network using services over a WAN only.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need a method and apparatus for providing a service at an incident scene is provided herein. During operation, a device will enter a geographic area (e.g., an incident scene), join a local-area network (LAN), and determine what services are presently being offered by other devices on the LAN. From a list of services deployed on the device, a determination is then made as to what services the device will run, and those services are then offered to all devices on the LAN.

Expanding on the above, traditional prior-art public safety systems offer centralized services that reside at a central location and are available to public safety officials in the field through a Wide Area Network (WAN) serving a large geographic area such as a city or county. Public safety systems are evolving such that first responders will be equipped with devices, in the form of handsets, laptops, etc. that will have the capability of wirelessly networking together in a high-speed Local Area Network (LAN) serving a much smaller geographic area, such as a city block. In the present invention, devices on the network will host client/server-based services for the needs of first responders. The benefits of hosting local services on the LAN are reduced latency connections from those services hosted in the LAN vs. the WAN, reduced data traffic on the WAN as the traffic now becomes local to the LAN, and the ability to operate without a connection to the WAN, for some services.

The incident scene network by its nature will be very dynamic. When an emergency arises, first responders are assigned to the incident and arrive on scene over time. During the course of the incident, first responders may be assigned/unassigned to the incident and arrive/leave the scene. Moreover, as first responders move about the incident scene, the connection of their devices to the network may change, particularly in an urban environment. Thus, the network is likely to have nodes where the connections between the nodes and the nodes themselves come and go during lifetime of the network.

The approach taken by devices within the LAN is to achieve a target level of availability of a service through the simultaneous running of multiple instances of that service on multiple devices acting as local servers. It is assumed that each service is designed to operate in a distributed manner and as such, any service state is kept in a distributed, replicating database that ensures changes to the service state on a given server are propagated to the service state on other servers running that service.

Consider the example of a prior-art system shown in FIG. 1 where multiple public-safety vehicles 101-105 are receiving a downlink video service from WAN 107. The video was received by WAN 107 by building 111. It should be noted that in this particular example, the use of a video service being provided by WAN 107 is for example only. WAN 107 may provide any number of services in a similar manner. A service comprises a data storage, manipulation, presentation, communication or other capability which is often implemented using a client-server or peer-to-peer architecture based on network protocols running at the application layer of a network. In addition, the term "services offered" is meant to comprise services whose capability is advertised and accessible at the application layer by other programs running on nodes in the network.

The downlink video feed is provided by base station 109 receiving the feed through radio access network (RAN) 111, which in turn receives the video feed from building 113 through WAN 107. Video from building 113 is originally supplied to vehicles 101-105 via WAN 107. The video feed is received by a remote device existing within vehicles 101-105 and used to display the video. As discussed above, WAN 107 may be taxed when providing video feeds to all devices on scene.

Figure 2:
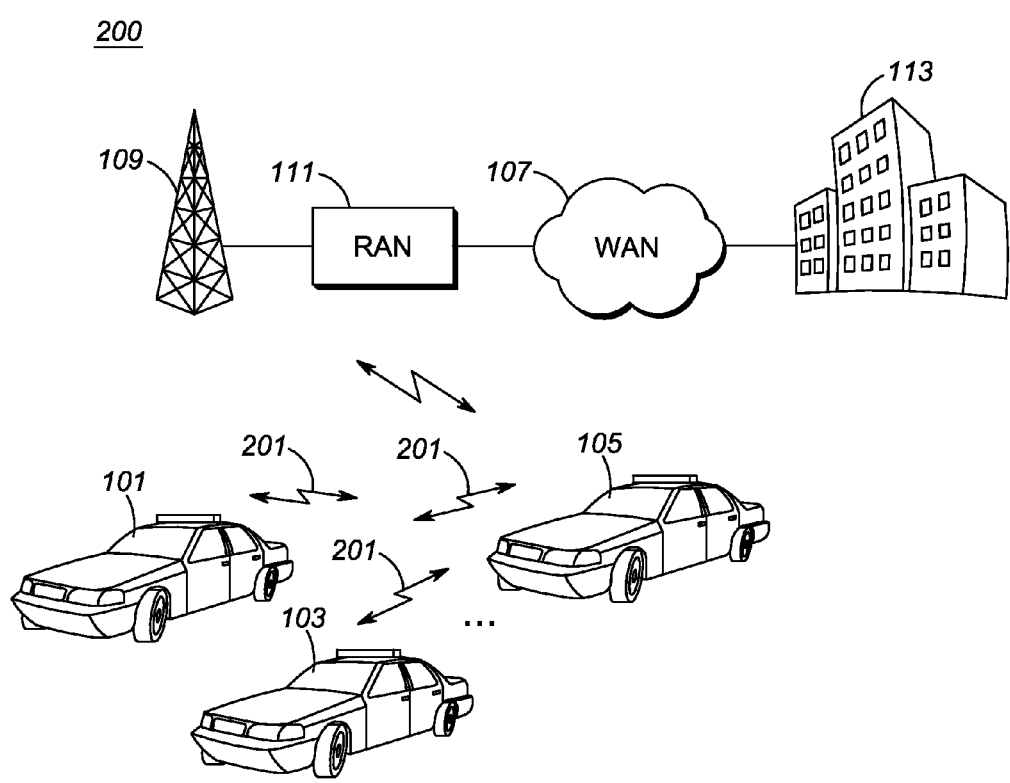
FIG. 2 illustrates an on-scene public-safety network utilizing services provided over both a WAN and a LAN.

Consider the above situation, only this time, having device 105 provide the video service to devices on scene. This is shown in FIG. 2. As is evident, only device 400 in vehicle 105 is receiving the video feed via WAN 107. Vehicle 105 will then act as a video server providing video services to devices 101 and 103 via LAN links 201. This greatly reduces the amount of bandwidth being utilized by WAN 107.

It should be noted that all devices on scene will ideally maintain both a LAN and a WAN link. For purposes of further discussion in this document, whenever a service is said to run on a device, it is implied that is also offered on a WAN. The LAN link will be utilized for locally provided services, while the WAN link will be a direct link to the infrastructure for such things as services not offered/available over the LAN. In addition, local instances of WAN-based services may exist so that a version of those services may be offered in the event that the WAN link is down.

Figure 3:
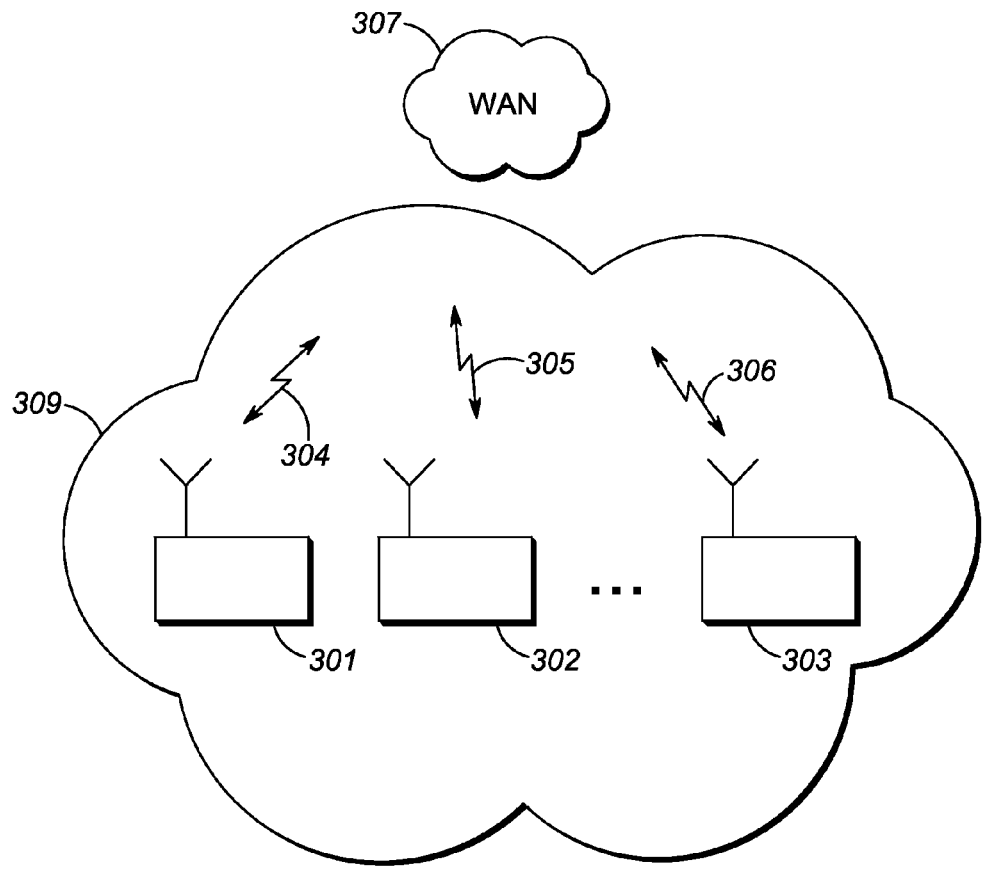
FIG. 3 is a block diagram illustrating a general operational environment, according to one embodiment of the present invention.

FIG. 3 is a block diagram illustrating a general operational environment, according to one embodiment of the present invention. As shown, devices 301-303 communicate through WAN 307 and LAN 309. Devices 301-303 may comprise any electronic device such as, but not limited to police radios, laptop computers, tablet computers, cellular telephones, PDAs, . . . , etc. Devices 301-303 may all be associated with a single user, or alternatively may be associated with different users. For example, devices 301-303 may be a single user's cellular telephone, police radio, tablet, . . . , etc. Alternatively, devices 301-303 may be devices (e.g., police radios) utilized by different police officers. Each device may act as a server, providing multiple services simultaneously to other devices through an established LAN.

Wide-area network 307 may utilize any combination of system protocols such as 3GPP2, 3GPP APCO 25, or any other communication system protocol. Communications among devices 301-303 may take place via an established LAN 309 utilizing an IEEE 802.11 system protocol, Bluetooth, HyperLAN, or any other LAN system protocol. It should be noted that the above-described operational environment does not rule out application of this technology to a mesh network. What is required is the communication between devices in topological proximity. In a LAN, this is accomplished via a non-routed broadcast or multicast packet. In a mesh network, it would be accomplished via a hop-limited all-hosts datagram.

During operation, devices 301-303 will utilize communication signals 304-306 to actively transmit uplink and receive downlink information to WAN 307 and among devices utilizing LAN 309.

Figure 4:
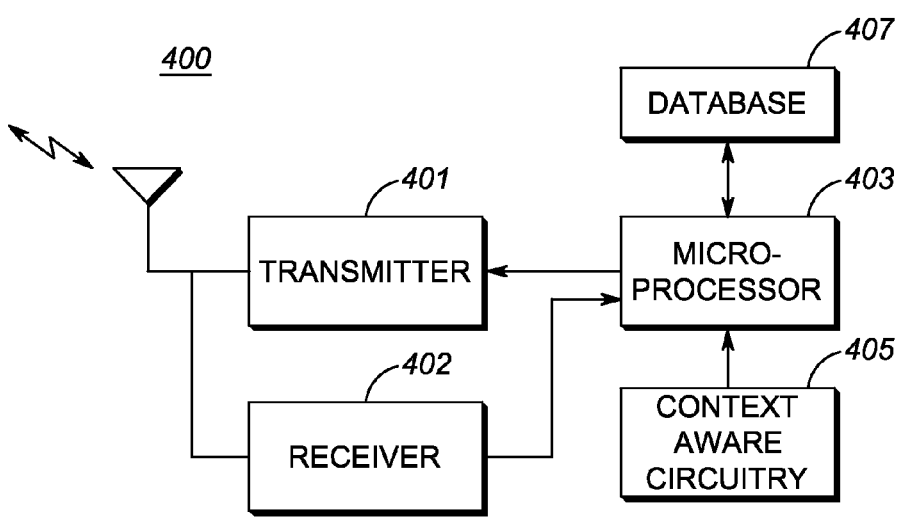
FIG. 4 is a block diagram of a remote device of FIG. 3.

FIG. 4 is a block diagram of a remote device 400, similar to those devices 301-303 shown in FIG. 3. As shown, device 400 comprises transmitter 401, receiver 402, microprocessor (logic unit) 403, optional context-aware circuitry 405, and database 407. Microprocessor 403 comprises a digital signal processor (DSP), general purpose microprocessor, a programmable logic device, or application specific integrated circuit (ASIC) and may be utilized to determine what services to offer other devices, and to offer those determined services.

Optional context-aware circuitry 405 may comprise any circuitry capable of generating a current context. For example, context-aware circuitry 405 may comprise a GPS or Bluetooth receiver capable of determining a location of the user device, may comprise a camera capable of facial detection, or may comprise a motion detector. Alternatively, circuitry 405 may comprise such things as a clock, calendar, environmental sensors (e.g. a thermometer capable of determining an ambient temperature, humidity, presence of dispersed chemicals, etc.), an accelerometer, a barometer, speech recognition circuitry, a user's electronic calendar, short-range communication circuitry (e.g., Bluetooth™ circuitry) to determine what other electronic devices are near . . . , etc.

Receiver 402 and transmitter 401 are common circuitry known in the art for communication utilizing a well known WAN and LAN communication protocol, and serve as means for transmitting and receiving messages among the various devices 301-303. Such transmitters and receivers include, but are not limited to transmitters and receivers utilizing 3GPP, 3GPP2, Bluetooth, IEEE 802.11, APCO, or HyperLAN protocols.

Finally, database 407 comprises standard random access memory and is used to store service-related information. This information includes a list of all of the services deployed on device 400 and for each of the deployed services: 1) the desired number of instances of each service to be run by devices on any particular LAN, 2) a list of all devices on the LAN on which the service is deployed and for each of those devices: a) the capacity of the device to run services simultaneously, and b) an indication whether or not the device is currently running the service.

During operation, microprocessor 403 will determine:
which services are deployed on device 400;
a number of devices currently running each service deployed on device 400;
how many devices may run each service deployed on device 400; and
whether or not the device will run a particular service.

A device is capable of running a service if the service is deployed on that device and the device has the capacity to run that service in addition to its current workload. From this information, microprocessor 403 determines what services device 400 will run; broadcasts those services as being offered to other devices, and provides the services being broadcast. At most, microprocessor 403 will run only one instance of a given service. These steps will be provided in detail below.

Determining which Services are Deployed on Device 400.

As mentioned above, database 407 is used to maintain a list of services that are deployed on device 400. During operation, logic circuitry 403 will access database 407 to determine this information.

Determining the Number of Devices that are Currently Running Each Service and how Many Devices May Run the Service.

An Information Propagating and Retrieval Mechanism (IPRM) will be utilized by all devices within a LAN to trade information on services currently being run and what services a device has deployed. In particular, a services discovery mechanism will utilize transmitted and received messages to multicast services run by each device and those services that are deployed on the device. The information broadcast consists of at least the following:

- Unique ID of server (device);
- List of services the server has deployed;
- List of services the server is running; and
- A measure of the capacity of this server to run services simultaneously.

The IPRM is implemented by microprocessor 403 requiring each device in the LAN to broadcast this information via a periodic multicast transmission. The list of services being run and the services that are deployed to the device may be provided to other devices in a compacted form, for example through the use of Bloom filters encoding the two sets of service identifiers. Transmitter 401 will be used to transmit this information as part of a broadcast message over the LAN, while receiver 402 will be utilized to receive similar information broadcast from other devices on the LAN. From this information, logic circuitry 403 will determine which devices on the LAN are currently running each service offered by device 400, along with which devices are currently running the service, and how many devices can run the service.

Determine Whether or not Device 400 Will Run a Particular Service

As discussed above, database 407 comprises information on services that may be run by device 400. In addition, database 407 comprises information on the number of devices running the service (T), the desirable number of instances of that service (R), and a number of devices that are capable of running the service. For example, device 400 may be capable of running video services, and a desirable number of devices on a LAN running video services may comprise two, and the number of devices running the service may comprise one. Such information is shown in table 1.

TABLE 1

| Service capable of being run | Desired number of desired instances of service on any particular LAN | Number of devices currently running the service | Number of devices that are capable of running the service but are not |
|---|---|---|---|
| Web Server | 3 | 2 | 4 |
| Video Server | 2 | 1 | 4 |
| ... | ... | ... | ... |
| Push-to-Talk Services | 2 | 1 | 1 |

Thus, when a LAN is joined by device 400, microprocessor 403 will determine what services are deployed on other devices in the network, a desired number of replication for the service, the number of instances of each service being run in the network, the number of devices capable of running the service but are not, and whether or not device 400 is capable of running the service. If, for example, microprocessor 403 is capable of running a service, and the number of instances of that service being run is below the desired number, then microprocessor 403 may run and offer that service.

On a given device 400, microprocessor 403 runs a subset of services device 400 has deployed if it will not exceed the number of simultaneous services allowed to run on device 400 (X), by using the following probability-based algorithm:

Let R=desired degree of replication of the service. Let X=the total number of services that could run simultaneously on this device. For each service that this device has deployed, microprocessor 403 determines:

T=the total number of devices running the service;
C=the total number of devices that are capable of running the service, but currently are not;
U=the total number of services running on device 400;
PStart=(R−T)/C.
PStop=(T−R)/T Microprocessor 403 will generate a random number i, $0<i<=1$. If $i<=PStart$, $U<X$, and the service is not currently being run on device 400, the service will be started on device 400. Alternatively, if $i<=PStop$, and the service is currently being run on device 400, the service will be stopped on device 400.

When the service is started on device 400, U and T will be incremented. Once the service is stopped, U and T will be decremented. Microprocessor 403 will periodically (e.g., once every 5 minutes) repeat the algorithm in its entirety.

Essentially, the above algorithm chooses to run a service on a particular device with a likelihood that increases as the difference between the replication target and current degree of replication increases. This likelihood decreases as the total number of devices in the system making a decision to run this service increases. This accounts for the fact that it will be more likely that another device will choose to run this service.

It is possible for this algorithm to allow more instances of a service to run on a LAN than is desired. When this happens, a future iteration of the algorithm will cause the service to be stopped with a similarly calculated probability.

Figure 5:
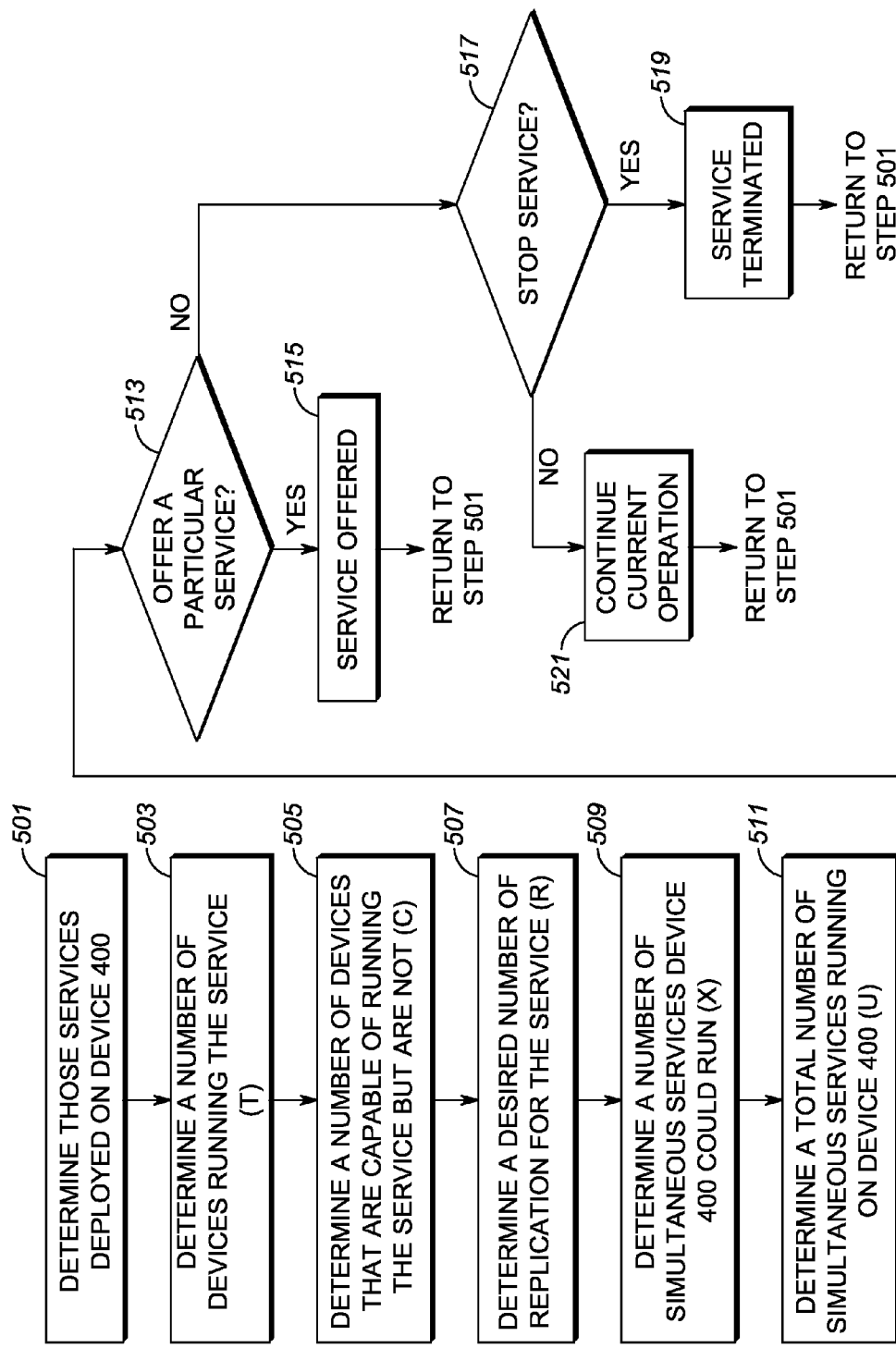
FIG. 5 is a flow chart showing operation of the device of FIG. 4.

FIG. 5 is a flow chart showing operation of device 400. For simplicity, the flow chart in FIG. 5 shows those steps (not all steps are necessary) for device 400 to offer a particular service to a LAN. In FIG. 5, the particular service will be referred to as Service W. The process shown in FIG. 5 can be repeated for each service deployed on device 400. As part of the logic flow, microprocessor 403 determines:

those services device 400 has deployed (step 501), with Service W being part of those services;
the number of devices within the LAN running Service W (T) (step 503);
the number of devices that are capable of running Service W, but are not (C) (step 505);
a desired number of replication for Service W (R) (step 507);
the number of simultaneous services device 400 could run (X) (step 509),
the total number of simultaneous services running on device 400 (U) (step 511).

As discussed above, step of determining the above parameters comprises accessing database 407 to determine these parameters, much of which were obtained by receiver 402 receiving information through the IPRM. The logic flow then continues to step 513 where microprocessor 403 determines whether or not device 400 is going to run and offer Service W. As discussed above, the determination on whether or not to run Service W is made based on a random number i, $0<i<=1$. If Service W is deployed and not currently being run on device 400, and if $i<=PStart$ and $U<X$, then Service W will be started on device 400 (step 515). If the above conditions are not met, then microprocessor 403 determines whether or not device 400 is going to stop service W (step 517). If Service W is deployed and is currently being run on device 400, and if $i<=PStop$, the service will stopped on device 400 (step 519). Finally, if neither of the above conditions are met, device 400 continues in its current state (step 521).

As is evident, the logic flow in FIG. 5:
- starts a service only when U<X, where U is a total number of services running on the device, and X is a total number of services that could run simultaneously on the device and the device is currently not running and offering the service;
- starts a service only when i<=PStart and U<X, where I is a random number i, 0<i<=1, PStart=(R−T)/C, R is a desired degree of replication for the particular service; and
- ceases a service if i<=PStop, where PStop=(T−R)/T and the device is currently running the service.

However, it should be noted that other parameters may be utilized to determine whether or not to run and offer a particular service. For example, a service may be run and offered only in certain geographic areas (as determined by context-aware circuitry 405). For example, it may be determined that push-to-talk services over a WAN are unreliable in a particular area due to coverage issues. This service may only be offered through a WAN in such areas. Similarly, it may be determined that there are an insufficient number of devices with spare capacity to run a minimum number of instances of a service and, hence, a required minimum availability cannot be achieved.

Those skilled in the art will recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for a computing device to offer a particular service to a Local Area Network (LAN), the method comprising the steps of:
   determining, by the computing device, a set of application layer services deployed at the computing device;
   determining, by the computing device, a number (T) of other computing devices within the LAN running and offering the particular application layer service;
   determining, by the computing device, a number (C) of the other computing devices within the LAN that are capable of running and offering the particular application layer service, but currently are not;

determining, by the computing device, a number (R) being a desired degree of replication of the particular application layer service in the LAN; and determining, by the computing device, whether to start, cease, or continue to offer the particular application layer service to the other computing devices on the LAN based on R, T, and C.

2. The method of claim 1, wherein the particular application layer service is started by the computing device only when U<X, where U is a total number of application layer services running on the computing device, and X is a total number of application layer services that could run simultaneously on the wireless computing device and the computing device is currently not running and offering the particular application layer service.

3. The method of claim 2, wherein the particular application layer service is started by the computing device only when I<=PStart and U<X, where I is a random number i, 0<i<=1, and where PStart=(R−T)/C, R is a desired degree of replication for the particular application layer service.

4. The method of claim 2, wherein the particular application layer service is ceased if I<=PStop, where I is a random number i, 0<i<=1, and where PStop=(T−R)/T and the computing device is currently running the particular application layer service.

5. The method of claim 1, wherein the LAN comprises a LAN associated with a public-safety incident scene.

6. The method of claim 1, wherein the step of determining T and C comprises the step of determining T and C with via over-the-air messages transmitted from the other computing devices.

7. A computing device comprising:
a receiver receiving information from other computing devices on a local-area network (LAN); and
logic circuitry configured to:
    determine a set of application layer services deployed on the computing device;
    from the received information, determine a number (T) of other computing devices within the LAN running and offering a particular application layer service, determining a number (C) of the other computing devices within the LAN that are capable of running and offering the particular application layer service, but currently are not;
    determine a number (R) being a desired degree of replication of the particular application layer service in the LAN; and
    determine whether to start, cease, or continue to offer the particular application layer service to the other computing devices on the LAN based on R, T, and C.

8. The computing device of claim 7, wherein the particular application layer service is started by the logic circuitry only when U<X, where U is a total number of application layer services running on the computing device, and X is a total number of application layer services that could run simultaneously on the computing device and the computing device is currently not running and offering the particular application layer service.

9. The computing device of claim 8, wherein the particular application layer service is started by the logic circuitry only when I<=PStart and U<X, where I is a random number i, 0<i<=1, and where PStart=(R−T)/C, R is a desired degree of replication for the particular application layer service.

10. The computing device of claim 8, wherein the particular application layer service is ceased if I<=PStop, and where PStop=(T−R)/T and the computing device is currently running the particular application layer service.

11. The computing device of claim 7, wherein the LAN comprises a LAN associated with a public-safety incident scene.

12. The computing device of claim 7, wherein receiver receives T and C via over-the-air messages transmitted from the other computing devices.

13. A method for a computing device to cease to offer a particular service to a Local Area Network (LAN), the method comprising the steps of:
determining, by the computing device, a set of application layer services deployed at the computing device;
determining, by the computing device, a number (T) of other computing devices within the LAN running and offering the particular application layer service;
determining, by the computing device, a number (C) of the other computing devices within the LAN that are capable of running and offering the particular application layer service, but currently are not; and
determining, by the computing device, to cease to offer the particular application layer service that it was previously offering to the other computing devices on the LAN based on T and C.

14. A computing device comprising:
a receiver receiving information from other computing devices on a local-area network (LAN); and
logic circuitry configured to:
    determine a set of application layer services deployed on the computing device;
    from the received information, determine a number (T) of other computing devices within the LAN running and offering a particular application layer service, determining a number (C) of the other computing devices within the LAN that are capable of running and offering the particular application layer service, but currently are not; and
    determine to cease to offer the particular application layer service that was previously being offered to the other computing devices on the LAN based on T and C.

* * * * *